(12) United States Patent
Macauley

(10) Patent No.: US 8,181,229 B2
(45) Date of Patent: May 15, 2012

(54) METHODS, SYSTEMS AND COMPUTER PROGRAM PRODUCTS FOR OPERATING A COMMUNICATIONS NETWORK WITH ENHANCED SECURITY

(75) Inventor: Daniel Warren Macauley, Fishers, IN (US)

(73) Assignee: CommScope, Inc. of North Carolina, Hickory, NC (US)

( * ) Notice: Subject to any disclaimer, the term of this patent is extended or adjusted under 35 U.S.C. 154(b) by 1086 days.

(21) Appl. No.: 12/054,739

(22) Filed: Mar. 25, 2008

(65) Prior Publication Data

US 2009/0249444 A1    Oct. 1, 2009

(51) Int. Cl.
    *G06F 7/04*    (2006.01)
(52) U.S. Cl. ................ 726/4; 726/21; 726/34; 439/491; 713/133; 340/572.7; 340/572.8
(58) Field of Classification Search .................. 439/491; 726/4, 21, 34; 713/153, 133; 340/572.7, 340/572.8
    See application file for complete search history.

(56) References Cited

U.S. PATENT DOCUMENTS

| | | | | |
|---|---|---|---|---|
| 5,394,503 A | * | 2/1995 | Dietz et al. | 385/135 |
| 6,784,802 B1 | * | 8/2004 | Stanescu | 340/687 |
| 2006/0047800 A1 | * | 3/2006 | Caveney et al. | 709/223 |
| 2007/0206749 A1 | * | 9/2007 | Pincu et al. | 379/142.1 |
| 2007/0236355 A1 | | 10/2007 | Flaster et al. | |
| 2009/0166404 A1 | * | 7/2009 | German et al. | 235/375 |

OTHER PUBLICATIONS

Notification of Transmittal of the International Search Report and the Written Opinion of the International Searching Authority for the corresponding PCT application No. PCT/US2009/001377 mailed Jun. 15, 2009.

* cited by examiner

*Primary Examiner* — Eleni Shiferaw
*Assistant Examiner* — Paul Callahan
(74) *Attorney, Agent, or Firm* — Myers Bigel Sibley & Sajovec, P.A.

(57) ABSTRACT

A communications system includes a plurality of patch panels having a plurality of connector ports connected to individual communication channels, a switch that provides access to multiple networks via one or more switch ports, a system manager that controls interconnections between the patch panels and the switch, and a plurality of patch cords configured to selectively interconnect patch panel connector ports. The system manager is configured to receive a request to connect an individual communication channel to a specific network, to identify which patch panel connector ports are required to be patched together via one or more patch cords in order to establish a circuit to the requested network, and to enable a switch port to activate the circuit. The system manager is configured to monitor connectivity of a circuit and to park a switch port associated with the circuit in response to detecting a change in circuit connectivity.

28 Claims, 5 Drawing Sheets

METHODS, SYSTEMS AND COMPUTER PROGRAM PRODUCTS FOR OPERATING A COMMUNICATIONS NETWORK WITH ENHANCED SECURITY

FIELD OF THE INVENTION

The present invention relates generally to networks and, more particularly, to network security.

BACKGROUND

Many businesses have dedicated communications systems that enable computers, telephones, facsimile machines and the like to communicate with each other through a private network, and with remote locations via a communications service provider. In most buildings, the dedicated communications system is hard wired using communication cables that contain conductive wire. In such hard wired systems, dedicated wires are coupled to individual service ports throughout the building. The wires from the dedicated service ports extend through the walls of the building to a communications closet or closets. The communications lines from the interface hub of a main frame computer and the communication lines from external communication service providers may also terminate within a communications closet.

A patching system is typically used to interconnect the various communication lines within a communications closet. In a communications patching system, all of the communication lines are terminated in an organized manner. The organized terminations of the various lines are provided via the structure of the communications closet. A mounting frame having one or more racks is typically located in a communications closet. The communications lines terminate on the racks, as is explained below.

Referring to FIG. 1, a typical patch panel rack 10 is shown. The rack 10 retains a plurality of patch panels 12 that are mounted to the rack 10. Each of the patch panels 12 includes connector ports (e.g., optical connector ports such as SC, ST and LC ports, etc.) 16. Each connector port 16 is hard wired to a respective communication line. Accordingly, each communication line is terminated on a patch panel 12 in an organized manner. In small patch systems, all communication lines may terminate on the patch panels of the same rack. In larger patch systems, multiple racks may be used, wherein different communication lines terminate on different racks.

In FIG. 1, interconnections between the various communication lines for the purpose of connecting users to various networks and/or network services are made using patch cords 13. Both ends of each patch cord 13 are terminated with connectors 15. The connector 15 at one end of a patch cord 13 is connected to a connector port 16 of a first communication line and the connector 15 at the opposite end of the patch cord 13 is connected to a connector port 16 of a second communications line. By selectively connecting the various communication lines with patch cords 13, any combination of communication lines can be interconnected, thereby providing access to various networks and/or network services.

In some enterprise environments, multiple networks may be accessible via a communications system. As such, it is important that patch cord connections are implemented properly to avoid connecting users to a network and/or network service for which they do not have authorization. Examples of such environments include multi-tenant office buildings, universities, government facilities housing a mix of low and high-security organizations, and hospitals that provide Internet access to patients while maintaining a secure network for patient records.

SUMMARY

In view of the above discussion, methods, systems and computer program products for operating a communications system with enhanced security are provided such that unauthorized access to networks and network services is prevented. In some embodiments of the present invention, a communications system includes a plurality of patch panels having a plurality of connector ports connected to individual communication channels, a switch that provides access to multiple networks via one or more switch ports, a system manager that controls interconnections between the patch panels and the switch, and a plurality of patch cords configured to selectively interconnect patch panel connector ports. The system manager is configured to receive a request to connect an individual communication channel to a specific network, to identify which patch panel connector ports are required to be patched together via one or more patch cords in order to establish a circuit to the requested network, and to enable a switch port to activate the circuit.

The system manager is configured to monitor connectivity (i.e., patch cord insertions/removals, etc.) of a circuit and to park (i.e., disable) a switch port associated with the circuit in response to detecting a change in circuit connectivity. In some embodiments, the system manager is configured to notify an administrator or other person that a switch port has been parked. In some embodiments, the system manager is configured to determine if a detected change to circuit connectivity is authorized, and then unpark the switch port in response to determining that the circuit connectivity change is authorized.

When a request is received at the system manager to connect an individual communication channel to a specific network, a work order is issued that identifies which patch panel connector ports are required to be patched together via one or more patch cords in order to establish a circuit to the requested network. The issued work order is implemented to establish the circuit. Upon verifying that the issued work order has been implemented accurately, a switch port is enabled to activate the circuit, thereby providing an individual communication channel access to a network/network service.

In some embodiments, the patch panels include a plurality of RF antennas, wherein each RF antenna is positioned adjacent a respective patch panel connector port. Each RF antenna is configured to activate and read information from an RFID tag. Each patch cord includes opposite ends with a respective RFID tag attached to each end. The system manager is configured to detect a different patch cord in a circuit by selectively energizing each RF antenna associated with the circuit such that each RF antenna activates and reads information from a patch cord RFID tag adjacent thereto.

Other technologies may be utilized for detecting patch cord. For example, in some embodiments, an identification chip having a unique identifier (e.g., serial number, serial ID, etc.) stored therein may be secured adjacent to each connector of a patch cord. A reader associated with a connector port is configured to read the unique identifier stored on a chip. In other embodiments, optical technology may be utilized to read the actual serial number or other identification number displayed on a patch cord. For example, a CCD camera or other optical device may be associated with a connector port or multiple connector ports and may be configured to read an identifier displayed on a patch cord.

DETAILED DESCRIPTION

Figure 1:
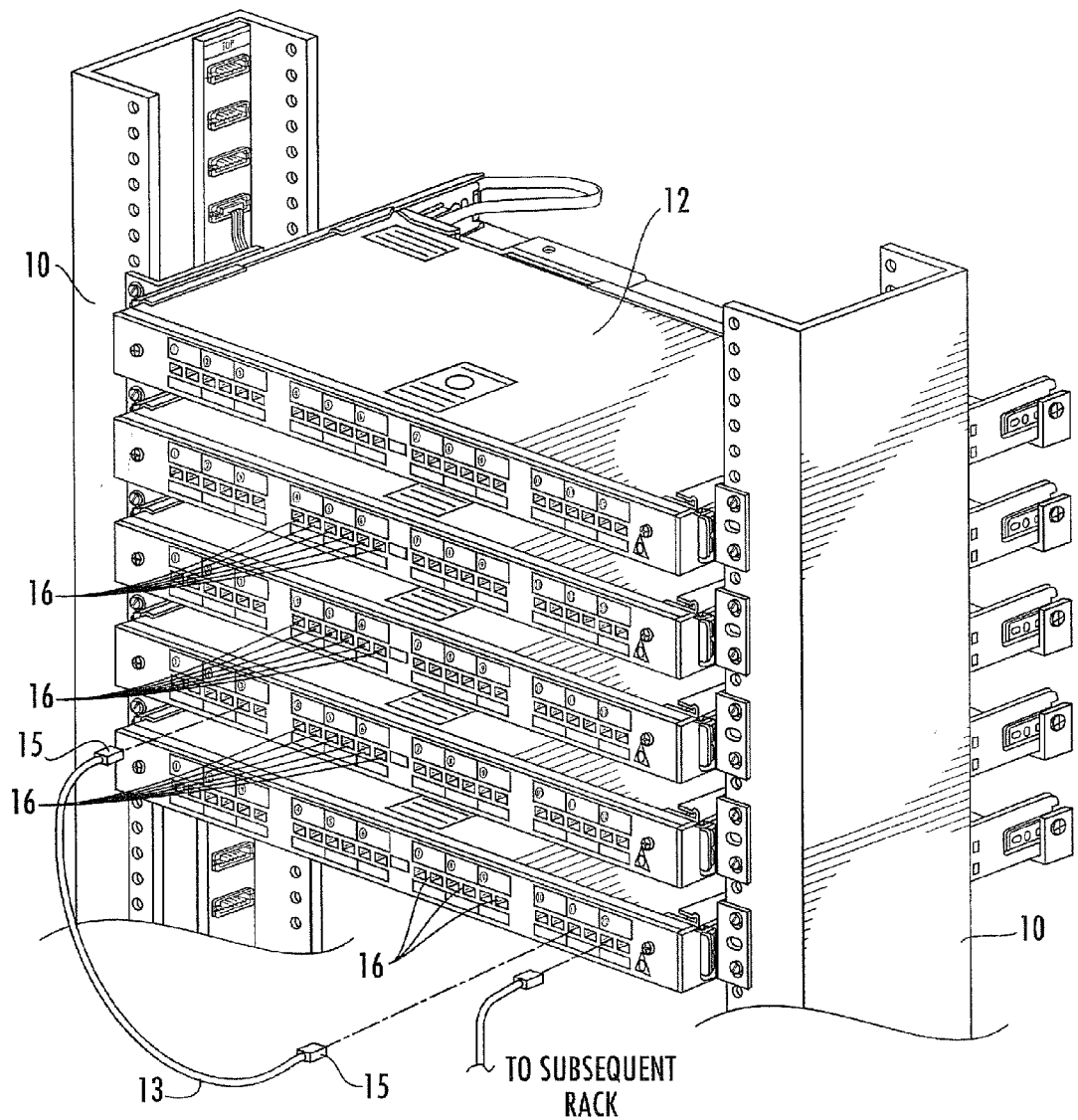
FIG. 1 is a perspective view of a typical network rack assembly containing multiple patch panels with connector ports that are selectively interconnected by patch cords.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first patch panel connector port could be termed a second patch panel connector port, and, similarly, a second patch panel connector port could be termed a first patch panel connector port without departing from the teachings of the disclosure.

The present invention may be embodied as systems, methods, and/or computer program products for operating a communications system with enhanced security. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), and a portable compact disc read-only memory (CD-ROM).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
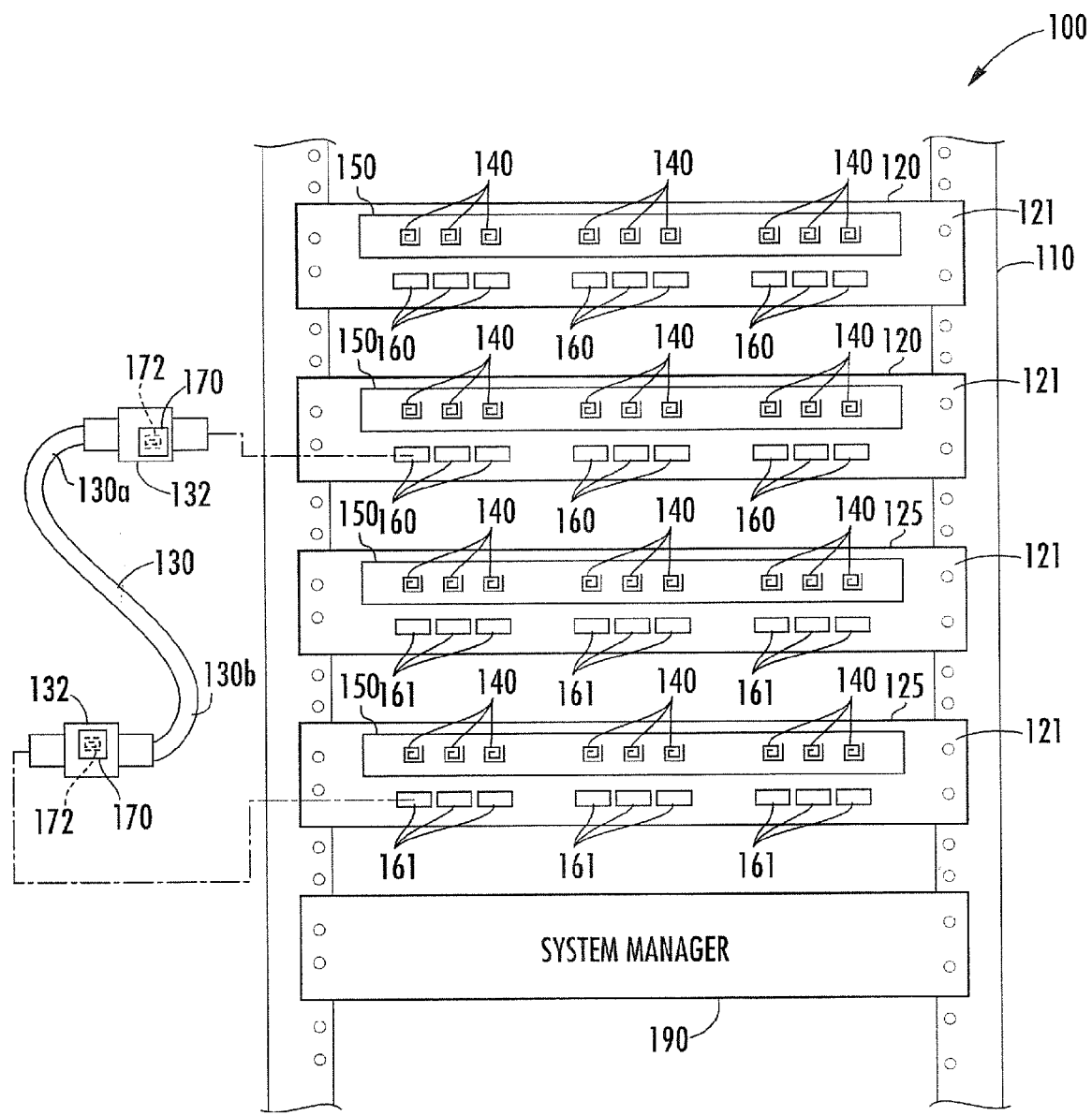
FIG. 2 illustrates a communications system, according to some embodiments of the present invention.

FIG. 2 illustrates a communications system 100, according to some embodiments of the present invention. The illustrated communications system 100 includes a plurality of patch panels 120, switches 125, and a system manager 190 mounted to a rack 110. Each patch panel 120 includes a plurality of connector ports 160, and each switch 125 includes a plurality of connector ports 161.

Each patch panel connector port 160 is connected to a respective individual communication channel in a local area network (LAN). As would be understood by those skilled in the art, a LAN is a system of personal computers, work stations, terminals and/or devices that are interconnected via a building's structured voice and/or data wiring to form a network that permits groups of people to work together. The term "individual communication channel" means the structured wiring from a patch panel connector port 160 to a particular device or jack connected to a LAN (e.g., a jack in a user's office, etc.). The terms "individual communication channel" and "communications line" as used herein are interchangeable.

Each switch 125 provides access to multiple networks and/or multiple network services such as Virtual Local Area Network (VLAN) services, etc., via one or more switch ports. An exemplary VLAN service is voice-over-internet protocol (VoIP) telephone service. Each switch 125 may be any type of network equipment that can be connected to a patch panel and through which access can be obtained to one or more networks and/or network services. Each switch connector port 161 provides access to a network and/or network service. By connecting a patch cord 130 to a patch panel connector port 160 and to a switch port 161, network access and/or network service can be provided to the communication channel associated with the respective patch panel connector port 160.

The system manager 190 contains a central processing unit (CPU) configured to control various functions of the patch panels 120 and switches 125, as would be understood by one skilled in the art of patch panel systems. The system manager 190 controls interconnections between the patch panels 120 and the switches 125. The system manager 190 is configured to receive a request (e.g., a move and change (MAC) request) to connect an individual communication channel to a specific network, to identify which patch panel connector ports 160 and switch ports 161 are required to be patched together via a patch cord 130 in order to establish a circuit to the requested network, and to enable a switch port 161 to activate the circuit. In some embodiments, the system manager 190 may enable switch ports 161 via a Simple Network Management Protocol (SNMP) command. As known to those skilled in the art, SNMP is the protocol governing network management and the monitoring of network devices and their functions. The system manager 190 may be configured to notify an administrator or other person that the requested network connection has been made.

Embodiments of the present invention, however, are not limited to the use of SNMP commands by the system manager 190. Various other technologies may be utilized to enable/disable switch ports 161 including, but not limited to, web based configuration, remote console configuration and/or configuration using a common software platform for managing switches 125. Other technologies include communicating through an http (Hypertext Transfer Protocol) interface where the software would login into the web portal and automatically interact with the web interface to configure the operation of the switch including setting and reading VLAN information. Another method would be to use a technology that would let the software interact with the remote console of the switch. Typically this would involve using telnet to gain access to the switch, sending a series of textual based commands, and then parsing the responses to update the settings of the switch.

The system manager 190 functions may be implemented by software executing within a CPU thereof. Alternatively, the system manger 190 may be implemented by software executing on several devices in communication with the communications system 100.

In the illustrated embodiment, an RF (Radio Frequency) antenna 140 is secured to each patch panel 120 adjacent each respective connector port 160, and to each switch 125 adjacent to each connector port 161. Each antenna 140 is configured to activate and read information from an RFID (Radio Frequency IDentification) tag that is positioned adjacent thereto. The RF antennas 140 may be secured to the patch panels 120 and switches 125 in various ways (e.g., adhesively attached, attached via fasteners, etc.), as would be known to those skilled in the art. In the illustrated embodiment, the RF antennas 140 are attached to a printed circuit board (PCB) 150 which is secured to the front surface 121 of each patch panel 120 and switch 125. The RF antennas 140 may be attached to a surface of the PCB 150, may be disposed within the PCB 150, or may have one or more portions disposed within the PCB 150 and one or more portions on a surface of the PCB 150, as would be understood by those skilled in the art.

Embodiments of the present invention are not limited to the illustrated PCB 150 configuration. The PCB 150 and RF antennas 140 may be disposed within each patch panel 120 and switch 125 and not visible from the outside. In other embodiments the RF antennas 140 may be disposed within the material of the front surfaces 121 of the patch panels 120 and switches 125.

A plurality of patch cords 130 are utilized to selectively interconnect patch panel connector ports 160 and switch ports 161, as would be understood by those skilled in the art of network patching systems. Each patch cord 130 includes a respective RFID tag 170 attached to a connector 132 at each respective end 130*a*, 130*b*. In the illustrated embodiment, when a patch cord connector 132 is inserted within a respective patch panel port 160, the RFID tag 170 attached to the connector 134 is positioned in close proximity to the RF antenna 140 associated with the port 160. Similarly, when a patch cord connector 132 is inserted within a respective switch port 161, the RFID tag 170 attached to the connector 134 is positioned in close proximity to the RF antenna 140 associated with the port 161.

An RFID tag 170 may be attached in various ways (e.g., adhesively attached) to a respective connector 132, as would be understood by those skilled in the art. Alternatively, an RFID tag 170 may be embedded within the material of a connector 132, as long as the RFID tag 170 can be positioned in close proximity to and read by an RF antenna 140 at a patch panel 120 and switch 125. In some embodiments, an RFID tag 170 may be attached to the patch cord end 130*a*, 130*b* adjacent a connector 132 thereof.

Moreover, RFID tags 170 may be attached to the cable connectors 132 in various orientations. It is desirable that the electromagnetic field lines of an RF antenna 140 penetrate as much of the area of an RFID tag 170 as possible. Accordingly, positioning an RFID tag 170 such that the RFID tag 170 can be close to an RF antenna 140 associated with a patch panel port 160 is desirable.

Each RFID tag 170 includes an antenna 172 and a microchip (not shown) which is configured to store various information (e.g., numbers, alphanumeric characters, etc.). According to embodiments of the present invention, each RFID tag 170 attached to a respective patch cord 130 stores a unique identifier (e.g., number, alphanumeric string, etc.), and may store other information, as well (e.g., cable model number and/or other cable information etc.). Typically, the two RFID tags 170 for a respective patch cord 130 contain the same identifier. However, this identifier will be different from the identifiers assigned to the RFID tags 170 in other patch cords 130.

As would be understood by those skilled in the art of the present invention, each RFID tag 170 draws power from an RF field created by an RF antenna 140 when the RF antenna 140 is activated. The RFID tag 170 uses this power to power the circuits of its microchip to thereby transfer information stored therein.

According to some embodiments of the present invention, RFID tags 170 can be factory installed on patch cords 130. Alternatively, RFID tags 170 can be retrofitted on patch cords 130 in the field. When RFID tags 170 are factory installed, they can be programmed with information that indicates manufacturing date, operator's ID, factory code, serial numbers, etc. If an RFID tag has read/write capabilities, then additional information could be added to the RFID tag in the field. For example, performance test data could be added to factory pre-programmed information.

RFID tags 170 that resonate at any frequency may be utilized in accordance with embodiments of the present invention. RF antennas and their use in detecting RFID tags and interrogating RFID tags for information are well understood by those of skill in the art and need not be discussed further herein.

Each PCB 150 attached to a respective patch panel 120 is in communication with a microprocessor (not shown). For example, each PCB 150 may be directly connected to the microprocessor and/or may be wirelessly connected to the microprocessor, etc. The microprocessor may be virtually any type of processor, such as an 8-bit processor, and may retain a history of events within memory. The microprocessor may be associated with the system manager 190, and/or other device/software that controls the various functions/operations of the plurality of patch panels 120 and switches 125 in the communications system 100. According to some embodiments of the present invention, the microprocessor is configured to selectively energize each antenna 140 such that each antenna 140 activates and reads information from an RFID tag 170 attached to a patch cord 130, if present.

In particular, according to some embodiments, the microprocessor is connected to RFID transceiver circuitry (not shown) in each PCB 150, which is in turn connected to all of the antennas 140 on the PCB 150 by way of a multiplexing device, such as an analog multiplexer or a switch array. The multiplexing device, under control of the microprocessor, connects the transceiver circuitry to any antenna 140 at any given time on demand. To activate an antenna 140 so as to read tag data from an RFID tag 170 located in proximity to that antenna 140, the following sequence is executed by the microprocessor. The microprocessor configures the multiplexer to establish a connection between the RFID transceiver circuitry on a PCB 150 and the specific RFID antenna 140 on the PCB 150 that is to be activated. The microprocessor issues a command to activate the RFID transceiver circuitry, which in turn energizes the selected antenna 140. The RFID transceiver circuitry then monitors the antenna 140 to see if a signal from an RFID tag is detected. If such a signal is detected, the RFID transceiver circuitry demodulates the RFID tag's signal and converts it into a digital bitstream, which is sent to the microprocessor. The microprocessor monitors the digital data from the RFID transceiver circuitry until it has received all of the data from an RFID tag 170 in question. The microprocessor sends a command to the RFID transceiver circuitry to shut down, which de-energizes the selected antenna 140.

At regular intervals, the microprocessor may send instructions to the RFID transceiver circuitry on a PCB 150 of a patch panel 120, requesting that it energize each RF antenna 140 associated with a respective port 160 to see if an RFID tag 170 is detected. Similarly, the microprocessor may send instructions to the RFID transceiver circuitry on a PCB 150 of a switch 125, requesting that it energize each RF antenna 140 associated with a respective port 161 to see if an RFID tag 170 is detected. If an RFID tag 170 is detected, the unique identifier from the RFID tag 170 can be recorded along with an identification of the patch panel connector port 160 and/or switch port 161. This information can be recorded, for example, in a database (or other data storage) associated with the microprocessor. The RF antennas 140 on each PCB 150 may be sequentially activated or some other pattern of activation may be utilized.

Once a circuit is established between an individual communication channel and a network, the system manager 190 is configured to monitor connectivity of the circuit. If the system manager detects a change in circuit connectivity, for example, if a patch cord 130 is disconnected from a patch panel port 160 or switch port 161, if a different patch cord 130 is inserted, etc., the system manager 190 is configured to park the switch port 161 such that the network cannot be accessed without authorization. The system manager 190 is configured to detect a different patch cord 130 in a circuit by selectively energizing the respective RF antennas 140 associated with the circuit such that each RF antenna 140 activates and reads information from patch cord RFID tags 170 adjacent thereto, as described above. For example, regular polling of the RF antennas 140 by the microprocessor, as described above, will detect that an RFID tag 170 is no longer present, and/or that a different RFID tag 170 is present.

Embodiments of the present invention are not limited to the use of RFID technology for patch cord detection/identification. Other technologies may be utilized as well. For example, an identification chip having a unique identifier (e.g., serial number, serial ID, etc.) stored therein may be secured adjacent to each connector of a patch cord. A reader associated with a connector port is configured to read the unique identifier stored on a chip. For example, serial ID chip technology uses a unique IC that has a serial number and some additional EEPROM/FLASH memory. The intelligent patching system would connect to the chip via some additional contacts to read and/or write to the chip. On method would be to put the chip on a label that is put on the plug on each end of the patch cord. The intelligent patch panel would have two additional contacts (outside of the jack) that would connect to the label and communicate with the chip.

As another example, optical technology may be utilized to read a serial number or other identification number displayed on a patch cord. For example, a CCD camera or other optical device may be associated with a connector port or multiple connector ports and may be configured to read an identifier displayed on a patch cord. The use of optical technologies including the use of CCD devices work by reading a label attached to each end of the patch cord. The label can be as simple as reading text or as complicated as reading an encoded graphic that compresses the data into a smaller space. This technology can also be used to read micro engraving in the plastic. The intelligent panel would read the label to obtain the serial number and any other information including security access.

The system manager 190 may be configured to notify an administrator or other person that a switch port 161 has been parked. The term "park" means that the switch port 161 is essentially disabled and cannot be used to access a particular network without authorization. Port parking is an advantageous security feature of embodiments of the present invention. In some embodiments, the system manager 190 is configured to determine if a detected change to circuit connectivity is authorized and if so, unpark the switch port to allow access to the network.

Figure 3:
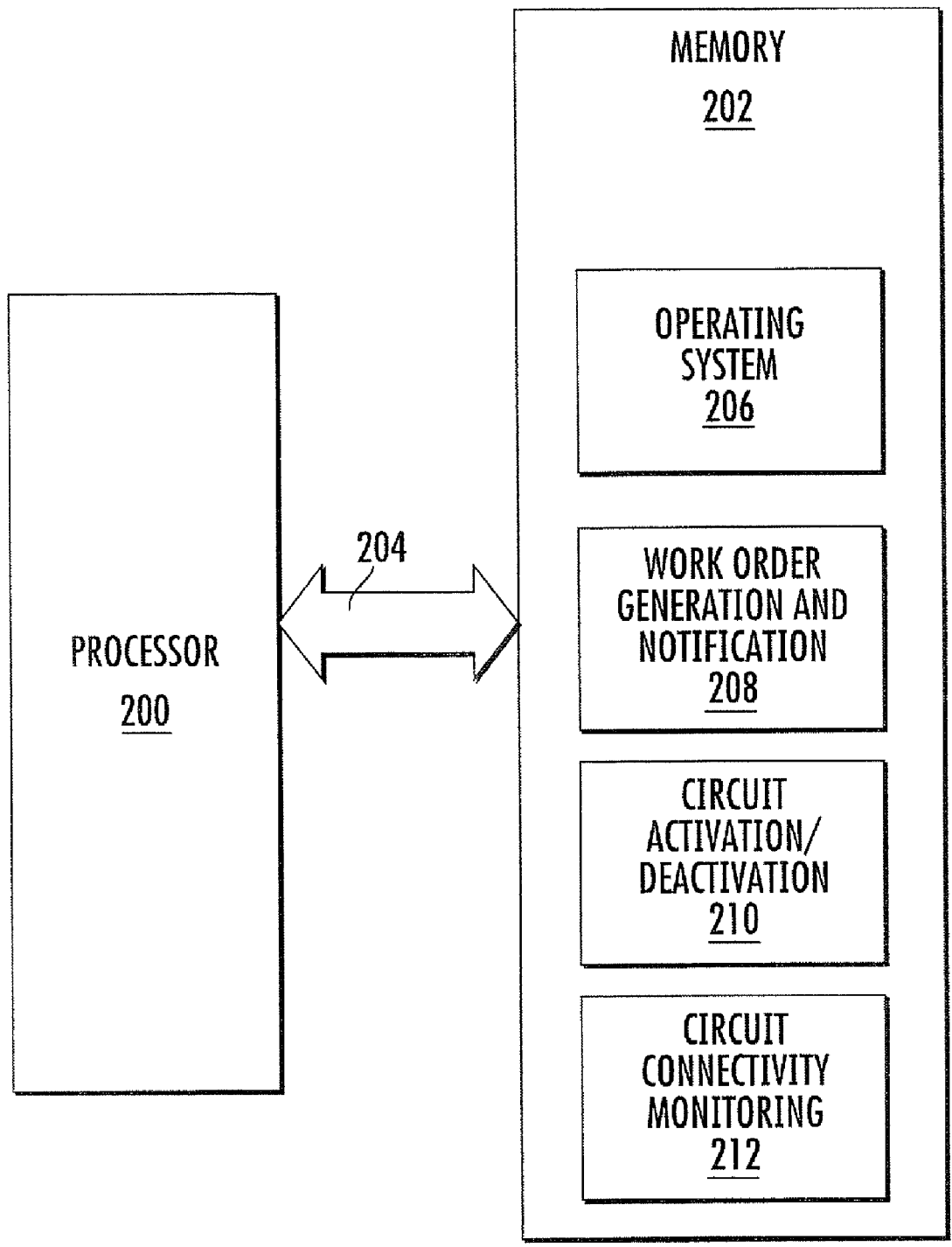
FIG. 3 is a block diagram that illustrates a software architecture for operating a communications system, in accordance with some embodiments of the present invention.

FIG. 3 illustrates a processor 200 and a memory 202 that may be used to implement the functions of the system manager 190 according to some embodiments of the present invention. For example, in some embodiments of the present invention, the processor 200 and memory 202 may be used to embody the processors and the memories used in generating work orders to enable MAC requests, enabling circuit activation upon completion of work orders, monitoring circuit connectivity for any changes, and for deactivating a circuit in response to detecting unauthorized circuit connectivity. The processor 200 communicates with the memory 202 via an address/data bus 204. The processor 200 may be, for example, a commercially available or custom microprocessor. The memory 202 is representative of the overall hierarchy of memory devices containing the software and data used to generate work orders to enable MAC requests, to enable circuit activation upon completion of a work order, to monitor circuit connectivity for any changes, and to deactivate a circuit in response to detecting unauthorized circuit connectivity, in accordance with some embodiments of the present invention. The memory 202 may include, but is not limited to, the following types of devices: cache, ROM, PROM, EPROM, EEPROM, flash, SRAM, and DRAM.

As shown in FIG. 3, the memory 202 may hold four or more major categories of software and data: an operating system 206, a work order generation and notification module 208, a circuit activation/deactivation module 210, and a circuit connectivity monitoring module 212. The operating system 206 controls operations of the system manager 190. In particular, the operating system 206 may manage the system manager's resources and may coordinate execution of programs by the processor 200.

The work order generation and notification module 208 comprises logic for generating work orders to configure patch panel connector ports 160 and switch ports 161 to provide a requested network connection/network service. In some embodiments, the work order generation and notification module 208 comprises logic for notifying a technician or technician group upon the generation of a work order.

The circuit activation/deactivation module 210 comprises logic for enabling a switch port 161 to activate a circuit for a requested network connection/network service upon completion of a work order. The circuit activation/deactivation module 210 also comprises logic for disabling (parking) a switch port 161 to deactivate a circuit upon the detection of an unauthorized change in circuit connectivity.

The circuit connectivity monitoring module 212 comprises logic for detecting patch cord insertions and removals from connector ports 160 in the patch panels 120 and switches 125. In some embodiments, the circuit connectivity monitoring module 212 comprises logic for parking switch ports 161 when an unauthorized change occurs to an established circuit.

Although FIG. 3 illustrates an exemplary software architecture that may facilitate generating work orders to enable MAC requests, to enable circuit activation upon completion of a work order, to monitor circuit connectivity for any changes, and to deactivate a circuit in response to detecting unauthorized circuit connectivity, it will be understood that the present invention is not limited to such a configuration, but is intended to encompass any configuration capable of carrying out the operations described herein. In addition, embodiments of the present invention can be integrated into management software utilized by intelligent patching systems.

Computer program code for carrying out operations of the system manager 190 discussed above with respect to FIG. 3 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

The present invention will now be described herein with reference to flowchart and/or block diagram illustrations of methods, systems, and computer program products for enabling network connectivity in a communications system in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions are provided to a processor of a patch panel rack controller, or other programmable data processing apparatus associated with a patch panel system, to produce a machine, such that the instructions, which execute via the processor and create means for implementing the functions specified in the flowchart and/or block diagram block or blocks.

These computer program instructions may also be stored in a computer usable or computer-readable memory that may direct a patch panel system controller to function in a particular manner, such that the instructions stored in the computer usable or computer-readable memory produce an article of manufacture including instructions that implement the function specified in the flowchart and/or block diagram block or blocks.

The computer program instructions may also be loaded onto a patch panel system controller or other programmable data processing apparatus to cause a series of operational steps to be performed on the controller or other programmable apparatus to produce a computer implemented process such that the instructions that execute on the controller or other programmable apparatus provide steps for implementing the functions specified in the flowchart and/or block diagram block or blocks.

Figure 4:
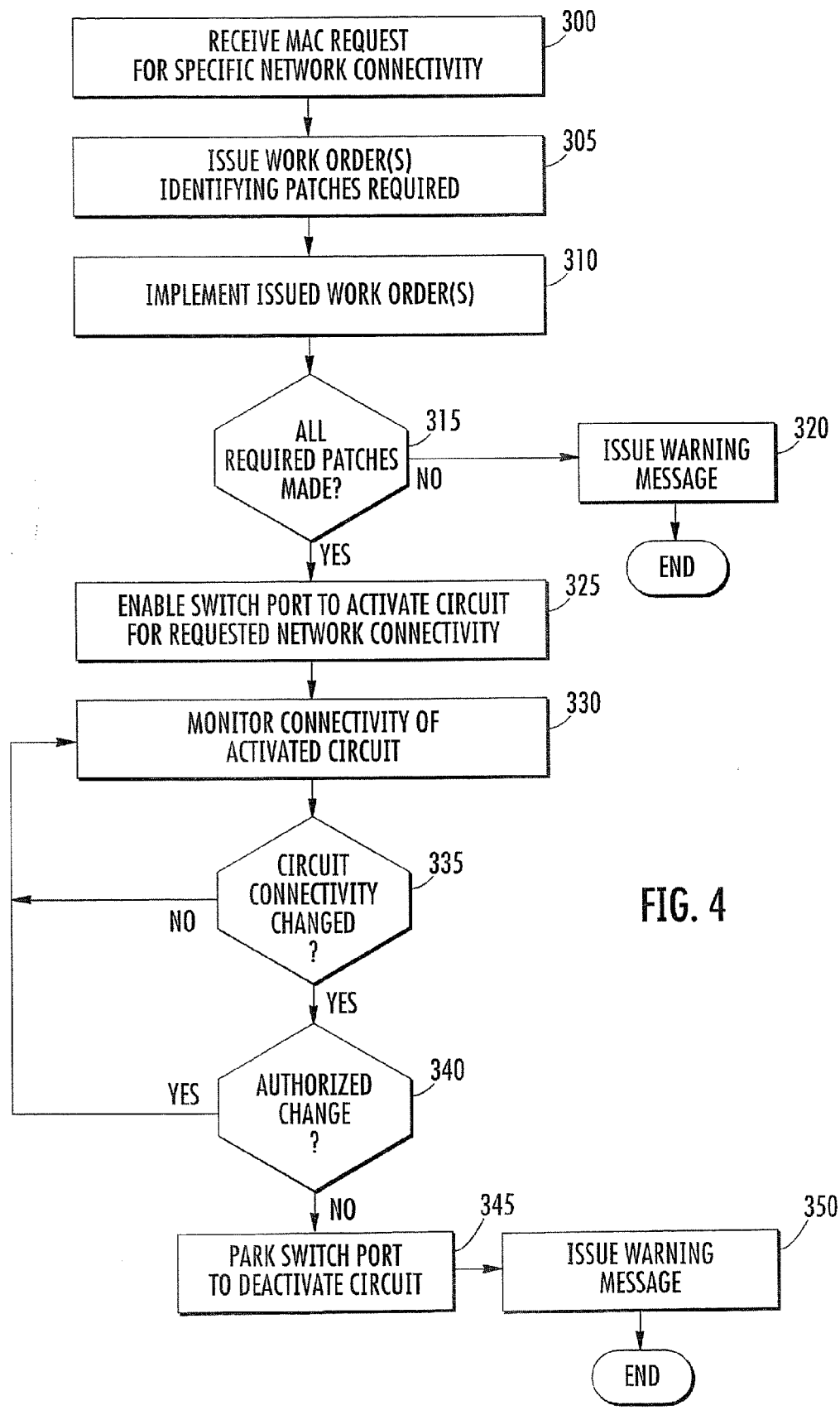
FIGS. 4-5 are flowcharts of operations for operating a communications system, in accordance with various embodiments of the present invention.
Figure 5:
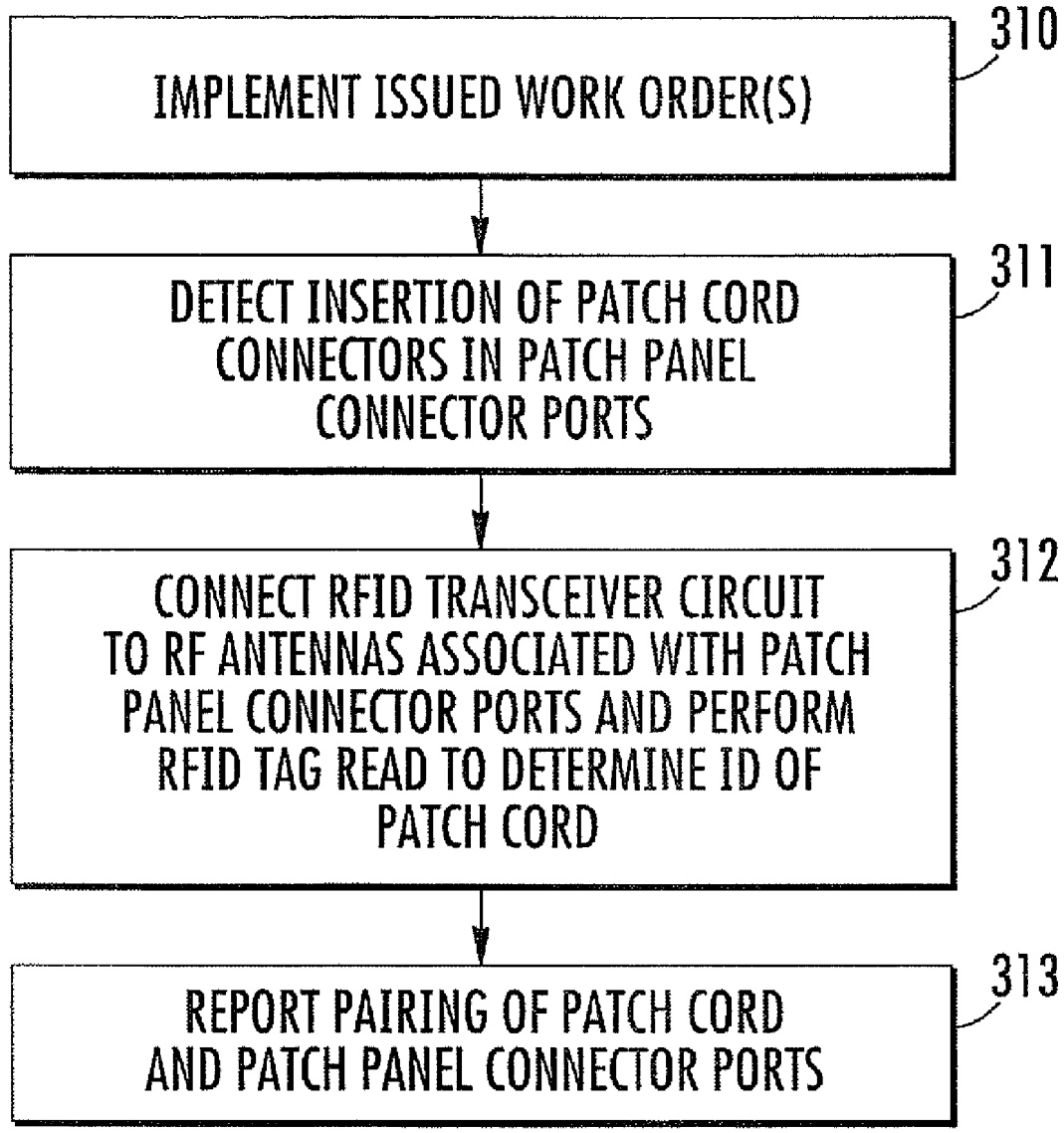

The flowcharts of FIGS. 4-5 illustrate the architecture, functionality, and operations of embodiments of methods, systems, and computer program products for implementing network connectivity. In this regard, each block in the flowcharts may represent a module, segment, or portion of code, which comprises one or more executable instructions for implementing the specified logical function(s). It should also be noted that in other implementations, the function(s) noted in the blocks may occur out of the order described with respect to FIGS. 4-5. Moreover, one or more blocks in a respective flowchart illustrated in FIGS. 4-5 may occur independently of other blocks in a respective flowchart.

Referring now to FIG. 4, methods of operating a communications system with enhanced security, according to some embodiments of the present invention, is illustrated. A MAC request is received by a system manager 190 to connect an individual communication channel to a specific network or network service (Block 300). This request can originate from a user associated with the communication channel and/or a system administrator (or other technician/person).

A work order is generated and issued that identifies which patch panel connector ports 160 and switch ports 161 are required to be patched together via one or more patch cords 130 (and/or other necessary operations) in order to establish a circuit to the requested network or network service (Block 305). As would be known to those skilled in the art of the present invention, a work order is a list of activities required to connect a communication channel to a network or network service. Activities may include, but are not limited to, port configuration, installing network equipment, installing patch panels, installing outlets, cabling outlets to panels, adding/removing/moving patch cords, adding/removing/moving devices such as computers and phones, making changes to a communication/data network on passive connecting hardware (e.g., connecting hardware, consolidation points, panels, etc.).

The issued work order is then implemented to establish the circuit (Block 310). FIG. 5 illustrates exemplary operations for implementing a work order in accordance with some embodiments of the present invention. The insertion of the connectors of a patch cord 130 in patch panel connector ports 160 and/or switch ports 161 is detected (Block 311), for example, via an RF antenna 140 at each connector port 160, 161. As described above, the RFID transceiver circuit is connected to the respective RF antennas associated with the patch panel and/or switch connector ports and an RFID tag read is performed to obtain an identification of the patch cord(s). The connector port pairings for each patch cord are reported back to the system manager 190 (Block 313).

The system manager 190 determines whether the issued work order has been implemented correctly (i.e., whether all required patches have been made) (Block 315). If all of the required patches have not been made, a warning message or other notification is issued (Block 320). In addition, in some embodiments, patch panel connector ports can be activated and deactivated (parked) by the system manager 190 based on whether or not an issued work order has been implemented correctly. A warning message can be issued in any of various ways. For example, an electronic message can be transmitted to a user and/or an administrator/technician via cell phone, pager, wrist watch, PDA, computer, etc. If all of the required patches have been made (i.e., the issued work order has been implemented accurately), a switch port is enabled to activate the circuit for the requested network/network service connectivity (Block 325).

Once established, the connectivity of the activated circuit is monitored for changes (Block 330). Changes that can be detected include patch cord removal from connector ports and/or patch cord insertion within other connector ports. For example, regular polling of the RF antennas 140 by a microprocessor, as described above, will detect that an RFID tag 170 for a patch cord 130 is no longer present, and/or that a different RFID tag 170 for a different patch cord 130 is present. The following are examples of the types of connectivity changes that embodiments of the present invention are configured to detect: 1) one end of a patch cord in an activated circuit is moved to a new patch panel connector port 160, thereby re-routing the activated circuit to a different end-user communication channel; 2) one end of a patch cord in an activated circuit is removed, an end of a new patch cord is inserted in the connector port just vacated, and then the free ends of the original and new patch cords are connected to a mini-hub, thereby restoring the original connectivity, but also allowing an additional party to tap unseen into the connection via the mini-hub; and 3) one end of a patch cord in the circuit is removed and then inserted directly into an illicit PC, wireless hub, etc.

If a circuit connectivity change is detected (Block 335), a determination is made whether the change is authorized (Block 340). If the change is authorized, monitoring of the connectivity of the activated circuit for changes continues (Block 330). If the change is not authorized, the switch port 161 is parked, thereby deactivating the circuit (Block 345). If the switch port 161 is parked, a warning message or other notification is issued (Block 350). A warning message can be issued in any of various ways. For example, an electronic message can be transmitted to a user and/or an administrator/technician via cell phone, pager, wrist watch, PDA, computer, etc.

In some embodiments, a switch port 161 may be automatically parked upon detection of a change in connectivity of an activated circuit. The switch port 161 may then be unparked, thereby re-enabling the circuit upon determining that the change was authorized.

Embodiments of the present invention can be applied to any type of communications system where patch panels are utilized to connect users to various networks, network services, and/or communication lines. For example, embodiments of the present invention can be applied to digital voice telephony systems, as well as other non-ethernet based technologies including, but not limited to, fibre channel and IP based systems.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of operating a communications system, wherein the communications system includes a plurality of patch panels having a plurality of connector ports connected to individual communication channels, a switch that provides access to multiple networks via one or more switch ports, a system manager that controls interconnections between the patch panels and the switch, and a plurality of patch cords configured to selectively interconnect patch panel and switch connector ports, the method comprising:
   receiving a request at the system manager to connect an individual communication channel to a specific network;
   issuing a work order that identifies which patch panel and switch connector ports are required to be patched together via a patch cord in order to establish a circuit to the requested network;
   enabling a switch port to activate the circuit in response to verifying that the issued work order has been implemented;
   monitoring connectivity of the circuit;
   detecting that connectivity of the circuit has changed; and
   parking the switch port in response to detecting that connectivity of the circuit changed.

2. The method of claim 1, further comprising notifying an administrator that the switch port has been parked.

3. The method of claim 1, further comprising:
   determining if the detected change to the connectivity of the circuit is authorized; and
   unparking the switch port in response to determining that the change to the connectivity of the circuit is authorized.

4. The method of claim 1, further comprising notifying an administrator that the requested network connection has been made.

5. The method of claim 1, wherein detecting that connectivity of the circuit has changed comprises detecting a different patch cord in the circuit.

6. The method of claim 1, wherein each patch cord includes opposite ends and a respective connector at each end that is configured to be removably secured within a respective connector port of a patch panel and switch, wherein each end of a patch cord has an associated RFID tag, and wherein each patch panel and switch includes an RF antenna adjacent each respective connector port that is configured to activate and read information from a patch cord RFID tag.

7. The method of claim 6, wherein the RFID tags for each patch cord have the same unique identifier stored therein.

8. The method of claim 6, wherein a microprocessor is configured to selectively energize each antenna such that each antenna activates and reads information from a patch cord RFID tag positioned adjacent thereto.

9. The method of claim 1, wherein each patch cord includes opposite ends and a respective connector at each end that is configured to be removably secured within a respective connector port of a patch panel and switch, wherein each end of a patch cord has an identification chip, wherein patch cord identification information is stored within the chip, and wherein each patch panel and switch includes a reader configured to read information from a cable identification chip.

10. The method of claim 9, wherein the patch cord identification chips for each patch cord have the same unique identifier stored therein.

11. The method of claim 1, wherein each patch cord includes opposite ends and a respective connector at each end that is configured to be removably secured within a respective connector port of a patch panel and switch, wherein each end of a patch cord has an identification number displayed thereon, and wherein each patch panel and switch includes an optical camera configured to read identification numbers displayed on a patch cord.

12. The method of claim 11, wherein a patch cord has the same unique identifier displayed at each end.

13. A computer program product for operating a communications system, comprising:

a non-transitory computer readable storage medium having computer readable program code embodied therein, the computer readable program code being configured to carry out the method of claim 1.

14. A method of operating a communications system, wherein the communications system includes a plurality of patch panels having a plurality of connector ports connected to individual communication channels, one or more switches that provide access to multiple networks via one or more connector ports, a system manager that controls communications between the patch panels and the one or more switches, and a plurality of patch cords configured to selectively interconnect patch panel connector ports and switch ports, the method comprising:
- receiving a request at the system manager to connect an individual communication channel to a specific network;
- issuing a work order that identifies which patch panel connector port and switch port are required to be patched together via a patch cord in order to establish a circuit to the requested network;
- enabling a switch port to activate the circuit in response to verifying that the issued work order has been implemented;
- monitoring connectivity of the circuit; and
- detecting that connectivity of the circuit has changed; and
- parking the switch port in response to detecting that connectivity of the circuit changed.

15. The method of claim 14, further comprising notifying an administrator that the requested network connection has been made.

16. The method of claim 14, further comprising notifying an administrator that the switch port has been parked.

17. The method of claim 14, further comprising:
- determining if the detected change to the connectivity of the circuit is authorized; and
- unparking the switch port in response to determining that the change to the connectivity of the circuit is authorized.

18. The method of claim 14, wherein detecting that connectivity of the circuit has changed comprises detecting a different patch cord in the circuit.

19. The method of claim 14, wherein each patch cord includes opposite ends and a respective connector at each end that is configured to be removably secured within a respective connector port of a patch panel and switch, wherein each end of a patch cord has an RFID tag attached thereto, wherein the RFID tags for each patch cord have the same unique identifier stored therein, and wherein each patch panel and switch includes an RF antenna adjacent each respective connector port that is configured to activate and read information from a patch cord RFID tag.

20. The method of claim 14, wherein a microprocessor is configured to selectively energize each antenna such that each antenna activates and reads information from a patch cord RFID tag positioned adjacent thereto.

21. The method of claim 14 wherein each patch cord includes opposite ends and a respective connector at each end that is configured to be removably secured within a respective connector port of a patch panel and switch, wherein each end of a patch cord has an identification chip, wherein patch cord identification information is stored within the chip, and wherein each patch panel and switch includes a reader configured to read information from an identification chip.

22. The method of claim 14, wherein each patch cord includes opposite ends and a respective connector at each end that is configured to be removably secured within a respective connector port of a patch panel and switch, wherein each end of a patch cord has an identification number displayed thereon, and wherein each patch panel and switch includes an optical camera configured to read identification numbers displayed on a patch cord.

23. A communications system, comprising:
- a patch panel comprising a plurality of connector ports connected to individual communication channels;
- a switch that provides access to multiple networks via one or more switch ports;
- a plurality of RF antennas, each RF antenna positioned adjacent a respective patch panel connector port and switch port, wherein each RF antenna is configured to activate and read information from an RFID tag;
- a patch cord configured to selectively interconnect respective connector ports of the patch panel and switch, wherein the patch cord includes opposite ends with a respective RFID tag attached to each end; and
- a system manager that controls interconnections between the patch panel and the switch, wherein the system manager is configured to receive a request to connect an individual communication channel to a specific network, to identify which patch panel and switch connector ports are required to be patched together via the patch cord in order to establish a circuit to the requested network, to enable a switch port to activate the circuit, to monitor connectivity of the circuit and to park the switch port in response to detecting a change in circuit connectivity.

24. The system of claim 23, wherein the system manager is configured to notify an administrator that the switch port has been parked.

25. The system of claim 23, wherein the system manager is configured to determine if a detected change to circuit connectivity is authorized, and unpark the switch port in response to determining that the circuit connectivity change is authorized.

26. The system of claim 23, wherein the system manager is configured to detect a different patch cord in the circuit by selectively energizing each RF antenna associated with the circuit such that each RF antenna activates and reads information from a patch cord RFID tag adjacent thereto.

27. A communications system, comprising:
- a patch panel comprising a plurality of connector ports connected to individual communication channels;
- a switch that provides access to multiple networks via one or more switch ports;
- a patch cord configured to selectively interconnect respective connector ports of the patch panel and switch, wherein the patch cord includes opposite ends with a respective identification chip at each end, wherein patch cord identification information is stored within each chip;
- a reader associated with each respective connector port that is configured to read information from a patch cord identification chip; and
- a system manager that controls interconnections between the patch panel and the switch, wherein the system manager is configured to receive a request to connect an individual communication channel to a specific network, to identify which patch panel and switch connector ports are required to be patched together via the patch cord in order to establish a circuit to the requested network, to enable a switch port to activate the circuit, to monitor connectivity of the circuit and to park the switch port in response to detecting a change in circuit connectivity.

28. A communications system, comprising:
a patch panel comprising a plurality of connector ports connected to individual communication channels;
a switch that provides access to multiple networks via one or more switch ports;
a patch cord configured to selectively interconnect respective connector ports of the patch panel and switch, wherein the patch cord includes opposite ends with an identification number displayed at each end;
an optical camera associated with each connector port and configured to read a displayed identification number from the patch cord; and
a system manager that controls interconnections between the patch panel and the switch, wherein the system manager is configured to receive a request to connect an individual communication channel to a specific network, to identify which patch panel and switch connector ports are required to be patched together via the patch cord in order to establish a circuit to the requested network, to enable a switch port to activate the circuit, to monitor connectivity of the circuit and to park the switch port in response to detecting a change in circuit connectivity.

* * * * *